(12) United States Patent
Naito et al.

(10) Patent No.: US 6,606,236 B2
(45) Date of Patent: Aug. 12, 2003

(54) POWDER FOR CAPACITOR, SINTERED BODY THEREOF, AND CAPACITOR USING THE SAME

(75) Inventors: Kazumi Naito, Chiba (JP); Shuji Kozono, Chiba (JP)

(73) Assignee: Showa Denko Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/235,791

(22) Filed: Sep. 6, 2002

(65) Prior Publication Data

US 2003/0117767 A1 Jun. 26, 2003

Related U.S. Application Data

(60) Provisional application No. 60/318,361, filed on Sep. 12, 2001, now abandoned.

(30) Foreign Application Priority Data

Sep. 7, 2001 (JP) ..................................... P2001-271149

(51) Int. Cl.$^7$ ................................................. H01G 9/02
(52) U.S. Cl. ..................................... 361/303; 361/508
(58) Field of Search ............................... 361/303, 508, 361/509, 528, 529; 75/244, 254; 751/84.4

(56) References Cited

U.S. PATENT DOCUMENTS

| | | | | |
|---|---|---|---|---|
| 4,512,805 A | * | 4/1985 | Albrecht et al. | ............... 75/244 |
| 5,082,491 A | * | 1/1992 | Rerat | ........................ 75/255 |

* cited by examiner

*Primary Examiner*—Anthony Dinkins
(74) *Attorney, Agent, or Firm*—Sughrue Mion, PLLC

(57) ABSTRACT

A capacitor having a large capacitance appearance ratio and a good moisture resistance value is provided. A sintered body is prepared using a powder for capacitor, having as the main component an earth-acid metal, preferably niobium, containing from 3 mass ppb to 1 mass ppm of phosphorus, and a capacitor is constituted from the sintered body as one part electrode, a dielectric material formed on the surface thereof, and another part electrode.

15 Claims, No Drawings

POWDER FOR CAPACITOR, SINTERED BODY THEREOF, AND CAPACITOR USING THE SAME

CROSS REFERENCE TO RELATED APPLICATIONS

This application is an application filed under 35 U.S.C. §111(a) claiming benefit pursuant to 35 U.S.C. §119(e)(1) of the filing date of the Provisional Application 60/318,361 filed Sep. 12, 2001 pursuant to 35 U.S.C. §111(b) now abandoned.

TECHNICAL FIELD OF THE INVENTION

The present invention relates to a capacitor having a large capacitance appearance ratio and a good moisture resistance value and also relates to a powder for the capacitor and a sintered body using the powder.

BACKGROUND ART

Earth-acid metals represented by tantalum and niobium are chemically stable and therefore, being used for various uses. For example, tantalum is widely used as a capacitor material for electronic instruments such as cellular phone and personal computers. Studies of niobium as a capacitor material are just starting; but its high dielectric performance is acknowledged as highly valuable.

The form of the earth-acid metal used as a capacitor material is usually powder and this powder is integrated through molding and sintering and becomes an electrode called a sintered body. Such a powder material from which a capacitor electrode is obtained is called a powder for capacitor.

The inside of the sintered body obtained as such has a three-dimensional complicated form where powders are electrically and mechanically connected with each other. On the inside and outside surfaces of this sintered body, a dielectric film layer is formed and thereinto, a material working out to another part electrode (also called "counter electrode") is impregnated, whereby a capacitor is fabricated. As long as the dielectric film layer uniformly adheres to the inside and outside surfaces of the sintered body, the capacitance of the capacitor manufactured greatly depends on, microscopically, the contact state between the another part electrode material and the dielectric film layer.

Assuming that the contact state with a dielectric film layer is complete when:i an aqueous phosphoric acid solution is used as another part electrode material and that the capacitance appearance ratio at this time is 100%, a capacitance appearance ratio of 100% can be hardly attained by using an electrode material having high viscosity, particularly a solid electrode material. In particular, as the average particle size of the powder for capacitor is smaller, the difficulty more increases and in an extreme case, the capacitance appearance ratio may not reach even 50%. When the capacitance appearance ratio is low as such, the capacitor manufactured suffers from an insufficient moisture resistance value.

DISCLOSURE OF THE INVENTION

As a result of extensive investigations, the present inventors have found that when a powder for capacitor, comprising as the main component an earth-acid metal containing a very slight amount of phosphorus is used, surprisingly, a capacitance appearance ratio which cannot be heretofore reached can be achieved and also that a capacitor using the powder has a good moisture resistance value. The present invention has been accomplished based on these findings. The main component is a component contained in a largest mount and a component contained in a proportion of more than 50% is the main component.

It is conventionally known that the sintering property of a sintered body can be improved by mixing phosphorus to the powder for capacitor and thereby the specific surface area of the sintered body can be increased. For example, U.S. Pat. No. 4,084,965 discloses a technique where from 5 to 600 ppm of phosphorus is added and thereby the CV value (a product of the capacitance in an electrolytic solution and the electrochemical forming voltage at the formation of a dielectric film; a physical value proportional to the specific surface area) is elevated. However, in the present invention, by adding phosphorus in a concentration by far smaller than the concentration described in the above-described publication, the capacitance after the impregnation of another part electrode material can be greatly elevated while not increasing the specific surface area of the sintered body. If phosphorus is added in a high concentration as conventionally known, the CV value increases but the capacitance after the impregnation of another part electrode material cannot be elevated to the same degree as the increase ratio of CV value. In the present invention, only the capacitance appearance ratio is elevated but this duly implies that by the addition of a slight amount of phosphorus, the contact state between the another part electrode material and the pore inside the sintered body is improved. Addition of phosphorus in a large amount seems to rather disturb the impregnation of the another part electrode material. Furthermore, although the strength of the sintered body decreases as the specific surface area increases, such a thing cannot occur in the present invention.

That is, the present invention relates to a powder for capacitor, a sintered body using the powder and a capacitor using the sintered body, which are described below.

(1) A powder for capacitor, comprising as the main component an earth-acid metal containing from 3 mass ppb to 1 mass ppm of phosphorus.

(2) The powder for capacitor as described in (1) above, wherein the earth-acid metal is niobium.

(3) The powder for capacitor as described in (1) or (2) above, wherein the average particle size is from 0.2 to 5 µm.

(4) The powder for capacitor as described in any one of (1) to (3) above, wherein the specific surface area of the powder is from 0.5 to 15 $m^2/g$.

(5) The powder for capacitor as described in any one of (1) to (4) above, wherein a part of the earth-acid metal is nitrided.

(6) A powder for capacitor, having an average particle size of 10 to 300µm, which is obtained by granulating the powder for capacitor described in any one of (1) to (5) above.

(7) A sintered body using the powder for capacitor described in any one of (1) to (6) above.

(8) The sintered body as described in (7) above, wherein the specific surface area is from 0.2 to 7 $m^2/g$.

(9) A capacitor comprising the sintered body described in (7) or (8) above as one part electrode, a dielectric material formed thereon, and another part electrode.

(10) The capacitor as described in (9) above, wherein the dielectric material comprises niobium oxide or tantalum oxide as the main component.

(11) The capacitor as described in (10) above, wherein niobium oxide or tantalum oxide is formed by electrolytic oxidation.

(12) The capacitor as described in any one of (9) to (11) above, wherein the another part electrode is composed of an organic semiconductor and the organic semiconductor is at least one organic semiconductor selected from the group consisting of an organic semiconductor comprising a benzopyrroline tetramer and chloranile, an organic semiconductor mainly comprising tetrathiotetracene, an organic semiconductor mainly comprising tetracyanoquino-dimethane, and an organic semiconductor mainly comprising an electrically conducting polymer obtained by doping a dopant into a polymer containing two or more repeating units represented by the following formula (1) or (2):

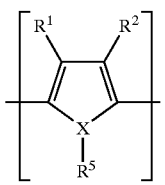

(1)

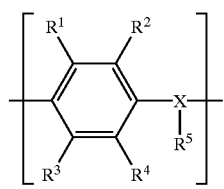

(2)

(wherein $R^1$ to $R^4$, which may be the same or different, each represents hydrogen, an alkyl group having from 1 to 6 carbon atoms or an alkoxy group having from 1 to 6 carbon atoms, X represents an oxygen atom, a sulfur atom or a nitrogen atom, $R^5$ is present only when X is a nitrogen atom, and represents hydrogen or an alkyl group having from 1 to 6 carbon atoms, and each of the pairs $R^1$ and $R^2$, and $R^3$ and $R^4$ may combine with each other to form a ring).

(13) The capacitor as described in (12) above, wherein the organic semiconductor is at least one member selected from the group consisting of polypyrrole, polythiophene and substitution derivatives thereof.

(14) The capacitor as described in (12) above, wherein the electrically conducting polymer is an electrically conducting polymer containing a repeating unit represented by the following formula (3): (3)

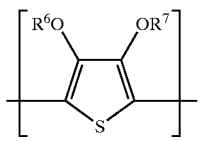

(3)

(wherein $R^6$ and $R^7$ each independently represents a hydrogen atom, a linear or branched, saturated or unsaturated alkyl group having from 1 to 6 carbon atoms, or a substituent for forming at least one 5-, 6- or 7-membered saturated hydrocarbon ring structure containing two oxygen elements when the alkyl groups combine with each other at an arbitrary position, and the ring structure includes a structure having a vinylene bond which may be substituted, and a phenylene structure which may be substituted).

(15) The capacitor as described in (14) above, wherein the electrically conducting polymer is an electrically conducting polymer obtained by doping a dopant into poly(3,4-ethylenedioxythiophene).

MODE FOR CARRYING OUT THE INVENTION

One embodiment for obtaining the powder for capacitor of the present invention is described below.

Representative examples, of the earth-acid metal for use in the present invention include tantalum, niobium, tantalum-niobium alloy and alloys containing tantalum or niobium as the main component. The powder comprising the earth-acid metal as the main component may be a generally available one. For example, the powder can be obtained by the reduction of a halogenated earth-acid metal with magnesium or sodium, the sodium reduction of a potassium fluoro-earth-acid metal, the molten salt (NaCl+KCl) electrolysis of a potassium fluoro-earth-acid metal on nickel cathode, the reduction of an alkali metal or an alkaline earth metal of earth-acid metal pentoxide with carbon or hydrogen, or the introduction of hydrogen into earth-acid metal ingot, followed by grinding/dehydro-genation.

The starting material of phosphorus contained in the earth-acid metal may be at least one selected from the group consisting of phosphorus oxide, phosphorus nitride, phosphorus carbide, phosphorus sulfide, phosphorus silicide, metal phosphides (compounds of phosphorus and a metal such as copper, silver, platinum, titanium, vanadium, chromium, manganese and iron), phosphates, and compounds represented by the following formulae (4), (5), (6) and (7) and salts thereof:

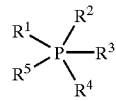

(4)

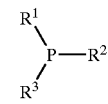

(5)

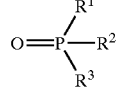

(6)

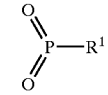

(7)

(wherein in formulae (4) to (7), $R^1$, $R^2$, $R^3$, $R^4$ and $R^5$ each independently represents at least one selected from hydrogen, a hydroxyl group, an alkyl group having 6 or less carbon atoms, an alkoxy group having 6 or less carbon atoms, an aryl group and a halogen, and assuming that the moiety resulting from removing $R^1$ in the compound represented by formulae (4) to (7) is $R^x$, $R^1$ and $R^2$ each independently may be $R^x$ or $O-R^x$, namely, the compound represented by formulae (4) to (7) may be a multimer of a phosphorus compound, having a phosphorus-phosphorus bond or a phosphorus-oxygen-phosphorus bond).

Examples of the compounds represented by formulae (4) to (7) include phosphoruso halide, trialkoxyphosphorus, trialkoxy phosphate, ammonium hexafluorophosphate and polyphosphiric acid.

The content of phosphorus contained in the earth-acid metal is from about 3 mass ppb to about 1 mass ppm, preferably from about 10 mass ppb to about 1 mass ppm. If the phosphorus content is out of this range, the effect of the present invention may not be obtained.

Examples of the method for incorporating a phosphorus compound into the earth-acid metal include a method of mixing a predetermined amount of a phosphorus compound with the earth-acid metal powder, a method of mixing a predetermined amount of a phosphorus compound with a raw material or an intermediate at the production of the earth-acid metal powder, and when the earth-acid metal is an ingot, a method of mixing Al a predetermined amount of a phosphorus compound at the production stage of ingot (after examining the mass of phosphorus flown off at the manufacture of ingot by a preliminary test) to prepare a so-called phosphorus-earth-acid metal alloy ingot.

The average particle size of the powder comprising as the main component an earth-acid metal having incorporated therein phosphorus is from about 0.1 μm to less than about 5 μm, preferably from about 0.2 μm to less than about 2 μm. If the average particle size is about 5 μm or more, the sintered body manufactured itself is small in the CV value and a capacitor having a large capacitance is disadvantageously difficult to produce, whereas if it is less than about 0.1 μm, the other part electrode material can be hardly impregnated even by the present invention and the capacitance rather decreases. The specific surface area of the powder having the above-described average particle size of the present invention is from about 0.5 to about 15 m$^2$/g. The powder for capacitor of the present invention may also be used after granulating the powder into a predetermined size.

For granulating the powder, conventionally known methods can be employed. Examples thereof include a method of allowing the powder to stand in a vacuum at a high temperature of about 500 to about 2,000° C. and then wet or dry grinding the powder, a method of mixing the powder with an appropriate binder such as acrylic resin and polyvinyl alcohol and then grinding the powder, and a method of mixing the powder with an appropriate compound such as acrylic resin and camphor, allowing the mixture to stand in a vacuum at a high temperature and then wet or dry grinding the mixture. The particle size of the granulated powder can be freely changed by the degree of granulation and grinding, however, a powder having an average particle size of about 10 to about 300 μm is usually used. After the granulation/grinding, the powder may be classified. Also, the granulated powder may be mixed with an appropriate amount of the powder before granulation.

The powder (including the granulated powder) for capacitor of the present invention is preferably a partially nitrided powder. The nitrided amount is from tens of mass ppm to tens of thousands of mass ppm. In order to obtain a small LC value when a sintered body is produced from this powder and the LC value is measured in an aqueous acetic acid solution after forming a dielectric material on the surface of the sintered body as described later, the nitrided amount is preferably from about 300 to about 7,000 mass ppm. The nitrided amount as used herein is not the amount of nitrogen adsorbed to the powder but the amount of nitrogen reacted to nitride the powder.

The nitridation of powder may be performed by any one of liquid nitridation, ion nitridation and gas nitridation or by a combination thereof. A gas nitridation treatment by a nitrogen gas atmosphere is preferred because the apparatus is simple and the operation is easy. For example, the gas nitridation by a nitrogen gas atmosphere is achieved by allowing the powder to stand in a nitrogen atmosphere. With a nitridation atmosphere temperature of about 2,000° C. or less and a standing time of several hours or less, a powder having an objective nitrided amount can be obtained. By performing the treatment at a high temperature, the treatment time can be shortened. The nitrided amount of the powder can be controlled by the conditions of nitridation temperature and nitridation time of the material to be nitrided, which are confirmed by a preliminary test or the like.

In the case of nitriding a granulated powder, it is also possible to produce a granulated powder from a nitrided non-granulated powder and further nitride the granulated powder.

The sintered body of the present invention is produced by sintering the above-described powder. One example of the method for producing the sintered body is described below, however, the production method of the sintered body is not limited to this example. The sintered body can be obtained, for example, by press-molding the powder into a predetermined shape and heating it at about 500 to about 2,000° C. under a pressure of $10^{-1}$ to $10^{-4}$ Pa for a few minutes to a few hours. The thus-obtained sintered body usually has a specific surface area of about 0.2 to about 7 m$^2$/g.

Also, by preparing a lead wire having appropriate shape and length and composed of a valve-acting metal such as niobium or tantalum, the powder may be press-molded such that a part of the lead wire is inserted inside the compact and integrally molded to serve as an outgoing lead of the sintered body.

Using this sintered body for one part electrode, a capacitor can be produced by interposing a dielectric material between this one part electrode and another part electrode. Examples of the dielectric material for the capacitor include dielectric materials comprising niobium oxide or tantalum oxide as the main component. For example, the dielectric material comprising niobium oxide as the main component can be obtained by electrochemically forming the niobium sintered body as one part electrode in an electrolytic solution. For electrochemically forming the niobium electrode in an electrolytic solution, an aqueous protonic acid solution is generally used, such as an aqueous 0.1% acetic acid solution or an aqueous sulfuric acid solution. In the case where a dielectric material comprising niobium oxide as the main component is obtained by electrochemically forming, the niobium electrode in an electrolytic solution, the capacitor of the present invention is an electrolytic capacitor and the niobium side serves as the anode.

The another part electrode of the capacitor of the present invention is, for example, at least one compound selected from organic semiconductors and inorganic semiconductors. Specific examples of the organic semiconductor include an organic semiconductor comprising a benzopyrroline tetramer and chloranile, an organic semiconductor mainly comprising tetrathiotetracene, an organic semiconductor mainly comprising tetracyanoquino-dimethane, and an organic semiconductor mainly comprising an electrically conducting polymer obtained by doping a dopant into a polymer containing a repeating unit represented by the following formula (1) or (2):

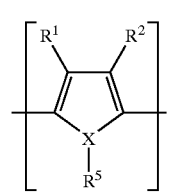

(1)

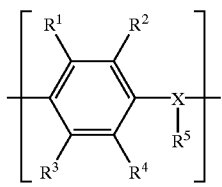

(2)

wherein $R^1$ to $R^4$ which may be the same or different, each represents hydrogen, an alkyl group having from 1 to 6 carbon atoms or an alkoxy group having from 1 to 6 carbon atoms, X represents an oxygen atom, a sulfur atom or a nitrogen atom, $R^5$ is present only when X is a nitrogen atom, and represents hydrogen or an alkyl group having from 1 to 6 carbon atoms, and each of the pairs $R^1$ and $R^2$, and $R^3$ and $R^4$ may combine with each other to form a ring In the present invention, the electrically conducting polymer containing a repeating unit represented by formula (1) is preferably an electrically conducting polymer containing a structure unit represented by the following formula (3) as a repeating unit:

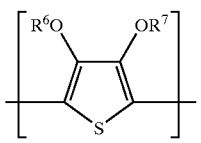

(3)

wherein $R^6$ and $R^7$ each independently represents a hydrogen atom, a linear or branched, saturated or unsaturated alkyl group having from 1 to 6 carbon atoms, or a substituent for forming at least one 5-, 6- or 7-membered saturated hydrocarbon ring structure containing two oxygen elements when the alkyl groups combine with each other at an arbitrary position, and the ring structure includes a structure having a vinylene bond which may be substituted, and a phenylene structure which may be substituted.

The electrically conducting polymer containing such a chemical structure bears electrical charge and is doped with a dopant. For the dopant, known dopants can be used without limitation.

Examples of the polymer containing a repeating unit represented by formula (1), (2) or (3) include polyaniline, polyoxyphenylene, polyphenylene sulfide, polythiophene, polyfuran, polypyrrole, polymethylpyrrole and substitution derivatives and copolymers thereof. Among these, preferred are polypyrrole, polythiophefie and substitution derivatives thereof (e.g., poly(3,4-ethylenedioxythiophene)).

Specific examples of the inorganic semiconductor include an inorganic semiconductor mainly comprising lead dioxide or manganese dioxide, and an inorganic semiconductor comprising tri-iron tetroxide. These semiconductors may be used individually or in combination of two or more thereof.

When the organic or inorganic semiconductor used has an electrical conductivity of $10^{-2}$ to $10^3$ S/cm, the capacitor produced can have a smaller impedance value and can be more increased in the capacitance at a high frequency.

In the case where the another part electrode is solid, electrically conducting layer may be provided thereon so as to attain good electrical contact with an exterior outgoing lead (for example, lead frame).

The electrically conducting layer can be formed using, for example, solidification of an electrically conducting paste, plating, vapor deposition of metal or formation of a heat-resistant electrically conducting resin film. Preferred examples of the electrically conducting paste include silver paste, copper paste, aluminum paste, carbon paste and nickel paste. These pastes may be used individually or in combination of two or more thereof. In the case of using two or more kinds of pastes, the pastes may be mixed or may be superposed one on another as separate layers. The electrically conducting paste applied is then solidified by allowing it to stand in air or under heating. Examples of the plating include nickel plating, copper plating, silver plating and aluminum plating. Examples of the metal vapor deposited include aluminum, nickel, copper and silver.

More specifically, for example, a carbon paste and a silver paste are stacked in this order on the another part electrode and these are molded with a material such as epoxy resin, whereby a capacitor is fabricated. This capacitor may have a niobium or tantalum lead which is integrally sintered and molded with the sintered body or welded afterward.

The thus-fabricated capacitor of the present invention is jacketed using, for example, resin mold, resin case, metallic jacket case, dipping of resin or laminate film, and then used as a capacitor product for various uses.

EXAMPLES

The present invention is described in greater detail below by referring to Examples.

The amount of trace phosphorus contained in the powder of the present invention is measured by the method using a flow injection/ICP-MS system which has been developed by the present applicant. The flow injection system comprises a peristack pump (MP-32, manufactured by Tokyo Rika Kikai K. K.), a Teflon valve (5020 and 5011, manufactured by Leodine), an anion exchange column assembly (a strongly basic ion exchange resin <Dowex 1-X8 manufactured by Muromachi Kagaku; 50 to 100 mesh> was filled in a Teflon tube), a Teflon membrane filter (FG, manufactured by Nippon Millipore Kogyo; pore size: 0.2 μm, area: 4.0 cm$^2$) and a Teflon tube (inner size of connection tube: 0.8 mm, reaction tube: 2.0 mm). This system is connected to ICP-MS (SPQ8000, manufactured by Seiko Instrument) and a membrane filter part using a Teflon tube, and installed in a clean room of class 1000. The nitrided amount of the powder was determined using a nitrogen-oxygen analyzer manufactured by LEKO. The CV value of the sintered body was determined from the product of an electrochemical forming voltage 20 V and a capacitance measured in 30% sulfuric acid after the electrochemical forming was performed in an aqueous 0.1% acetic acid solution at 80° C. for 200 minutes while applying a voltage of 20 V. The capacitance appearance ratio was expressed by a ratio of a capacitance in 30% sulfuric acid when the electrochemical forming was performed for 1,000 minutes under the above-described conditions, which is taken as 100%, to a capacitance after the fabrication of a capacitor. The moisture resistance value of the capacitor is expressed by the number of units showing, when the capacitor was produced and left standing at 60° C. and 95% RH for 500 hours, a capacitance exceeding 120% of the initial value. As the number is smaller, the moisture resistance is better. The number of samples used for determining the CV value, the capacitance appearance ratio and the moisture resistance value was 30 units in each Example.

Examples 1 to 5 and Comparative Examples 1 to 3

To a niobium powder having an average particle size of 0.8 μm (specific surface area: 3.8 cm$^2$/g), a predetermined amount of separately prepared triethoxyline was added to have a phosphorus content shown in Table 1. Then, the powder of each Example was heated in a vacuum at 1,200° C., taken out, ground and classified to obtain a granulated powder having an average particle size of 90 μm (specific surface area: 1.3 cm²/g). From the granulated powder of each Example, a compact in a size of 1.8×3.5×4.5 mm was molded (a niobium wire having a diameter of 0.3 mm was molded together and served as a lead) and sintered at 1,300° C. under reduced pressure of $7 \times 10^{-3}$ Pa to obtain a sintered body. The CV value of the sintered body is shown in Table 1. Thereafter, the sintered body was electro-chemically formed in the same manner as in the determination of the CV value except for changing the electrochemical forming time to 1,000 minutes. Into pores inside the sintered body, polypyrrole (obtained using ammonium persulfate as the oxidizing agent and sodium anthraquinonesulfonate as the dopant by repeating the reaction between pyrrole and oxidizing agent in the presence of the dopant) was filled as another part electrode material. Furthermore, a carbon paste and a silver paste were stacked thereon in this order and the laminate was sealed with epoxy resin to manufacture a capacitor. The capacitance appearance ratio of each Example is shown in Table 1.

Examples 6 to 10 and Comparative Examples 4 to 6

Capacitors were manufactured in the same manner as in Examples 1 to 5 and Comparative Examples 1 to 3 except that the another part electrode material is changed from polypyrrole to a mixture of lead dioxide and lead sulfate (lead dioxide: 98 mass %, obtained by repeating a reaction between an aqueous lead acetate solution and an aqueous ammonium persulfate solution in pores of the sintered body) in Examples 1 to 5 and Comparative Examples 1 to 3.

Examples 11 to 15 and Comparative Examples 7 to 9

Capacitors were manufactured in the same manner as in Examples 1 to 5 and Comparative Examples 1 to 3 except that the average particle size of the niobium powder was changed from 0.8 μm to 1.5 μm (specific surface area: 2.1 cm²/g) and the triethoxyline was changed to phosphoric acid in Examples 1 to 5 and Comparative Examples 1 to 3.

Examples 16 to 20 and Comparative Examples 10 to 12

Capacitors were manufactured in the same manner as in Examples 1 to 5 and Comparative Examples 1 to 3 except that the niobium powder having an average particle size of 0.8 μm was changed to a tantalum powder having an average particle size of 0.75 μm (specific surface area: 1.5 cm²/g), the average particle size of the granulated powder was changed to 150 μm (specific surface area: 0.7 cm²/g) and the sintering temperature was changed from 1,300° C. to 1,350° C. in Examples 1 to 5 and Comparative Examples 1 to 3.

The moisture resistance value of each capacitor manufactured is shown in Table 1.

TABLE 1

| | Concentration of Phosphorus, ppb | CV Value, μFV/g | Capacitance Appearance Ratio, % | Moisture Resistance Value, units |
|---|---|---|---|---|
| Example 1 | 3 | 84000 | 78 | 0/30 |
| Example 2 | 10 | 84000 | 85 | 0/30 |
| Example 3 | 160 | 84000 | 88 | 0/30 |
| Example 4 | 680 | 84000 | 85 | 0/30 |
| Example 5 | 970 | 84000 | 83 | 0/30 |
| Comparative Example 1 | 0 | 84000 | 68 | 4/30 |
| Comparative Example 2 | 9000 | 97000 | 60 | 9/30 |
| Comparative Example 3 | 90000 | 102000 | 59 | 17/30 |
| Example 6 | 3 | 84000 | 80 | 0/30 |
| Example 7 | 10 | 84000 | 86 | 0/30 |
| Example 8 | 160 | 84000 | 87 | 0/30 |
| Example 9 | 680 | 84000 | 86 | 0/30 |
| Example 10 | 970 | 84000 | 85 | 0/30 |
| Comparative Example 4 | 0 | 84000 | 72 | 2/30 |
| Comparative Example 5 | 9000 | 97000 | 67 | 5/30 |
| Comparative Example 6 | 90000 | 102000 | 63 | 9/30 |
| Example 11 | 5 | 58000 | 90 | 0/30 |
| Example 12 | 22 | 58000 | 92 | 0/30 |
| Example 13 | 230 | 58000 | 92 | 0/30 |
| Example 14 | 705 | 58000 | 93 | 0/30 |
| Example 15 | 960 | 58000 | 94 | 0/30 |
| Comparative Example 7 | 0 | 58000 | 80 | 3/30 |
| Comparative Example 8 | 12000 | 68000 | 75 | 7/30 |
| Comparative Example 9 | 150000 | 71000 | 68 | 11/30 |
| Example 16 | 3 | 35000 | 85 | 0/30 |
| Example 17 | 16 | 35000 | 91 | 0/30 |
| Example 18 | 180 | 35000 | 90 | 0/30 |
| Example 19 | 490 | 35000 | 89 | 0/30 |
| Example 20 | 990 | 35000 | 89 | 0/30 |
| Comparative Example 10 | 0 | 35000 | 77 | 2/30 |
| Comparative Example 11 | 15000 | 40000 | 71 | 5/30 |
| Comparative Example 12 | 190000 | 46000 | 62 | 5/30 |

On comparison between Examples 1 to 5 and Comparative Examples 1 to 3, between Examples 6 to 10 and Comparative Examples 4 to 6, between Examples 11 to 15 and Comparative Examples 7 to 9, and between Examples 16 to 20 and Comparative Examples 10 to 12, it is seen that when a capacitor is manufactured from a powder mainly comprising an earth-acid metal containing from 3 mass ppb to 1 mass ppm of phosphorus, the capacitor is increased in the capacitance appearance ratio and improved in the moisture resistance value.

INDUSTRIAL APPLICABILITY

According to the present invention, a powder for capacitor, a sintered body using the powder and a capacitor fabricated from the sintered body as one part electrode and a dielectric material and another part electrode formed on the sintered body are provided, which enable the production of a capacitor having a large capacitance appearance ratio and a good moisture resistance value.

What is claimed is:
1. A powder for capacitor, comprising as the main component an earth-acid metal containing from about 3 mass ppb to about 1 mass ppm of phosphorus.

2. The powder for capacitor as claimed in claim 1, wherein the earth-acid metal is niobium.

3. The powder for capacitor as claimed in claim 1, wherein the average particle size is from about 0.2 to about 5 μm.

4. The powder for capacitor as claimed in claim 1, wherein the specific surface area of the powder is from about 0.5 to about 15 m²/g.

5. The powder for capacitor as claimed in claim 1, wherein a part of the earth-acid metal is nitrided.

6. A powder for capacitor, having an average particle size of about 10 to about 300 μm, which is obtained by granulating the powder for capacitor claimed in claim 1.

7. A sintered body using the powder for capacitor as claimed in claim 1.

8. The sintered body as claimed in claim 7, wherein the specific surfaced area of the sintered body is from about 0.2 to about 7 m²/g.

9. A capacitor comprising the sintered body claimed in claim 7 as one part electrode, a dielectric material formed thereon, and another part electrode.

10. The capacitor as claimed in claim 9, wherein the dielectric material comprises niobium oxide or tantalum oxide as the main component.

11. The capacitor as claimed in claim 10, wherein niobium oxide or tantalum oxide is formed by electrolytic oxidation.

12. The capacitor as claimed in claim 9, wherein the another part electrode is composed of an organic semiconductor and the organic semiconductor is at least one organic semiconductor selected from the group consisting of an organic semiconductor comprising a benzopyrroline tetramer and chloranile, an organic semiconductor mainly comprising tetrathiotetracene, an organic semiconductor mainly comprising tetracyanoquinodimethane, and an organic semiconductor mainly comprising an electrically conducting polymer obtained by doping a dopant into a polymer containing two or more repeating units represented by the following formula (1) or (2):

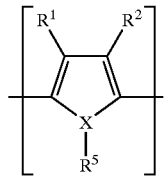

(1)

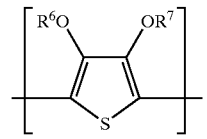

(2)

(wherein $R^1$ to $R^4$, which may be the same or different, each represents hydrogen, an alkyl group having from 1 to 6 carbon atoms or an alkoxy group having from 1 to 6 carbon atoms, X represents an oxygen atom, a sulfur atom or a nitrogen atom, $R^5$ is present only when X is a nitrogen atom, and represents hydrogen or in alkyl group having from 1 to 6 carbon atoms, and each of the pairs $R^1$ and $R^2$, and $R^3$ and $R^4$ may combine with each other to form a ring).

13. The capacitor as claimed in claim 12, wherein the organic semiconductor is at least one member selected from the group consisting of polypyrrole, polythiophene and substitution derivatives thereof.

14. The capacitor as claimed in claim 12, wherein the electrically conducting polymer is an electrically conducting polymer containing a repeating unit represented by the following formula (3):

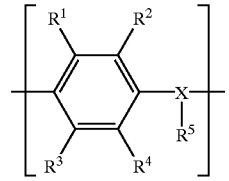

(3)

(wherein $R^6$ and $R^7$ each independently represents a hydrogen atom, a linear or branched, saturated or unsaturated alkyl group having from 1 to 6 carbon atoms, or a substituent for forming at least one 5-, 6- or 7-membered saturated hydrocarbon ring structure containing two oxygen elements when the alkyl groups combine with each other at an arbitrary position, and the ring structure includes a structure having a vinylene bond which may be substituted, and a phenylene structure which may be substituted).

15. The capacitor as claimed in claim 14, wherein the electrically conducting, polymer is an electrically conducting polymer obtained by doping a dopant into poly(3,4-ethylenedioxythiophene).

* * * * *